J. H. FARLEY.
Milk Can.
No. 62,949.
Patented March 19, 1867.
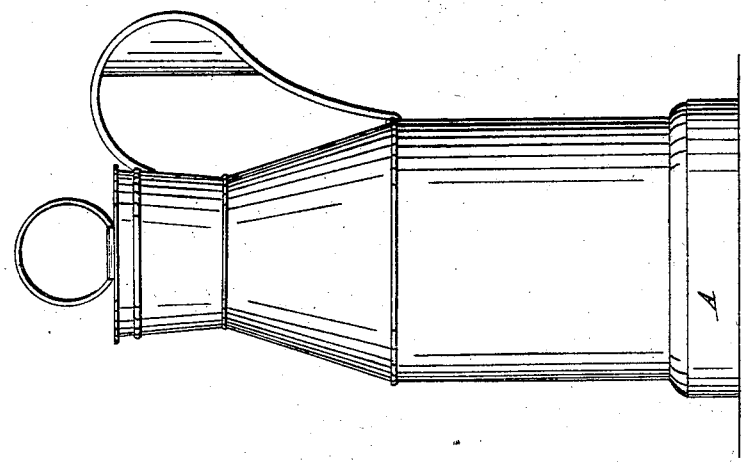
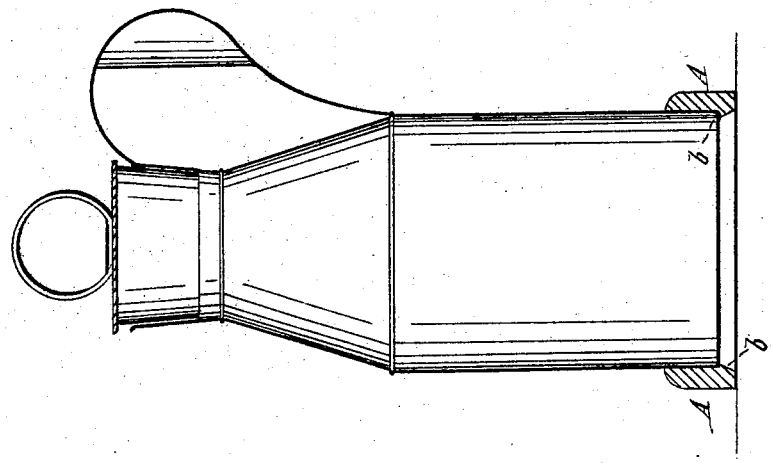
Witnesses:
Inventor:
James H. Farley

United States Patent Office.

JAMES H. FARLEY, OF LOWELL, MASSACHUSETTS.

Letters Patent No. 62,949, dated March 19, 1867.

---

IMPROVEMENT IN MILK CANS.

---

*The Schedule referred to in these Letters Patent and making part of the same.*

---

TO ALL WHOM IT MAY CONCERN:

Be it known that I, JAMES H. FARLEY, of Lowell, in the county of Middlesex, and State of Massachusetts, have invented a new and useful Improvement in Milk Cans, of which the following is a full, clear, and exact description, reference being had to the accompanying drawings, making part of this specification, in which—

Figure 1 is a vertical central section; and

Figure 2 a side elevation.

My invention consists in surrounding the bottom end of the ordinary milk can with a metallic ring or hoop, A, which has a shoulder, $b$, projecting inward about one-fourth of an inch from the bottom of said ring. The bottom of the milk can bears upon the shoulder $b$ and fills the interior of the ring above said shoulder. This ring may project outward from the milk can from one-eighth of an inch to one-half of an inch, or as much as is desired, and should be firmly united with the body of the can where the two come together. The object of this projecting ring is to keep the cans apart, when several of them are placed in a car or a wagon, and thereby prevent them from knocking together and getting bruised, jammed, or indented; and, as the ring projects downward below the bottom of the can, said can bottom is less liable to become indented, or otherwise injured, than the ordinary can. The weight of the ring A serves to keep the milk can in a vertical position when empty, preventing it tipping or rocking when being transported in car or wagon; besides, the bottom end of the ring has a flat, broad surface, which prevents it chafing or wearing the floor of the ordinary milk wagon, as is the case with the ordinary milk cans.

What I claim as new, and desire to secure by Letters Patent, is—

The ring A, constructed as described, in combination with the bottom part of a milk can, substantially as described and for the purpose herein set forth.

JAMES H. FARLEY.

Witnesses:
JOHN E. CRANE,
J. S. WHITNEY.